United States Patent
Watkins et al.

(10) Patent No.: US 7,656,418 B2
(45) Date of Patent: Feb. 2, 2010

(54) USER CONTROL OF 3D VOLUME PLANE CROP

(75) Inventors: Stephen Watkins, Windham, NH (US); Steven Araiza, Malden, MA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 161 days.

(21) Appl. No.: 10/559,212

(22) PCT Filed: Jun. 7, 2004

(86) PCT No.: PCT/IB2004/050858

§ 371 (c)(1),
(2), (4) Date: Dec. 6, 2005

(87) PCT Pub. No.: WO2004/109603

PCT Pub. Date: Dec. 16, 2004

(65) Prior Publication Data

US 2006/0197780 A1    Sep. 7, 2006

Related U.S. Application Data

(60) Provisional application No. 60/477,543, filed on Jun. 11, 2003.

(51) Int. Cl.
G09G 5/00    (2006.01)

(52) U.S. Cl. .................................. 345/620; 128/916

(58) Field of Classification Search ............... 345/620, 345/623, 625, 650, 653, 427; 600/443; 128/916
See application file for complete search history.

(56) References Cited

U.S. PATENT DOCUMENTS

| 4,734,690 A * | 3/1988 | Waller ........................ 345/427 |
| 6,334,847 B1 | 1/2002 | Fenster et al. |
| 2001/0017624 A1 | 8/2001 | Noettling |
| 2003/0095120 A1 | 5/2003 | Klotz et al. |

OTHER PUBLICATIONS

"Fast Volume Rendering Using Shear-Warp Factorization of the Viewing Transformation", P.G. LaCroute, Computer Systems Laboratory, Depts. Of Elec. Eng. & Comp. Science, Stanford University, 1995.

* cited by examiner

*Primary Examiner*—Jeffery A Brier

(57) ABSTRACT

A method for interactive adjustment of a 3D ultrasound image of an object includes acquiring a loop of 3D image data of the object, and providing a 3D image of the object on a display for user viewing. The method also includes activating a crop mode via a user interface in response to a user input to generate a cropping plane. The cropping plane may be oriented by the user in relation to the orientation of the image of the object in image space. The cropping plane is displayed along with the 3D image. The user may manipulate the user interface to control the orientation of the cropping plane in the image space with respect to the orientation of the image.

30 Claims, 7 Drawing Sheets

USER CONTROL OF 3D VOLUME PLANE CROP

CROSS REFERENCE TO RELATED APPLICATION

This application claims the benefit of U.S. provisional application Ser. No. 60/477,543 filed Jun. 11, 2003, which is incorporated herein by reference.

The present invention relates to three-dimensional (3D) ultrasound imaging, and more particularly relates to implementation of a graphic plane to crop of 3D volumetric images in real time.

Surface rendering is an imaging technique where volumetric data are converted into geometric primitives by a process such as isosurfacing, isocontouring, surface extraction or border following. The primitives, such as polygon meshes or contours, are then rendered for display using conventional geometric rendering techniques.

Volume rendering is an imaging technique for visualizing 3D arrays of sampled data. 3D data arrays are widely used for representing image information. Put another way, volume rendering is a technique or method of direct display of data sampled in 3D. For example, medical imaging technologies such as ultrasound can produce 3D arrays of sampled data containing detailed representations of internal organs. The basic steps of volume rendering consist of assigning a color and an opacity value to each sample in a 3D input array, projecting the samples onto an image plane and blending the samples. The foundation for such visualization is a physically based model for the propagation of light in a colored, semi-transparent material.

Each of the elements of the 3D array (volume) is called a voxel, which represents a small cube in space, or a point sample of a continuous scalar function. The volume rendering process comprises an approximate simulation of the propagation of light through a participating medium. The medium may be thought of as a block of colored, semi-transparent gel in which color and opacity are functions of the scalar values of the input array. Light may be absorbed, scattered or transmitted by the volume, as known to those skilled in the art. FIG. 1 is a simple physical model for volume rendering. The figure shows a light ray 156 propagating from source 150 through a cube 154 of semitransparent gel, and scattering onto a single image plane 152. Each voxel in the volume of cube 154 emits light and absorbs a fraction of light passing through it. The value of each pixel comprising the cube is computed by sampling the voxel values along the viewing ray from a point x on the image plane to a point $X_B$ on the opposite boundary of the volume and then numerically calculating what is known to those skilled in the art as a volume rendering integral.

A key advantage of volume rendering is that volume data need not be thresholded, in contrast to surface rendering techniques. Surface rendering techniques for volume data operate by fitting polygons to an iso surface in the volume (as known to those skilled in the art), and then rendering the polygonal model with traditional polygonal rendering techniques.

Also known to those skilled in the art, volume rendering requires that the physical volume of interest is first acquired in a form of a 3D array, including opacity values. The acquisition process may include preparation steps such as resampling the volume to a regular grid, interpolating missing voxel values, and applying image-processing operators to improve contrast. Typically, opacity values are accorded values from 0 to 55 in a classification step. The array is typically stored as a number of z of x-y planes, where each z is a 2D slice in memory. An alternative method would be to partition the volume into specific structure using a segmentation algorithm, and then assigning opacity values to the segmented structures.

After classifying the data, a shading function is typically employed to specify the illumination model and a rule for determining color of each voxel. Careful use of visual cues, such as specular highlights, depth cueing and shadows greatly improve the effectiveness of a visualization. The particular rendering system then chooses the viewing parameters such as viewpoint, type of projection (parallel or perspective), clipping (i.e., cropping) planes, etc. Prior art volume cropping techniques typically are implemented pre-rendering.

Many acceleration techniques are known for volume rendering, the most successful of which use spatial data structures. Philippe G. Lacroute, FAST VOLUME RENDERING USING SHEAR-WARP FACTORIZATION OF THE VIEWING TRANSFORMATION, Computer Systems Laboratory, Depts. Of Electrical Engineering and Computer Science, Stanford university (1995). There are four major classes of volume rendering algorithms: ray casting, splatting, cell projection and multi-pass resampling. Ray casting algorithms produce an image by casting a ray through the volume for each image pixel and integrating the color and opacity along the ray. Ray casters are sometimes called backward projection algorithms since they calculate the mapping of voxels to image pixels by projecting the image pixels along viewing rays into the volume. Light rays flow forward from the image whereas viewing rays flow backward from the image into the volume.

In contrast to ray casting algorithms, splatting algorithms operate by iterating over the voxels. More particularly, the splatting algorithm computes the contribution of a voxel to the image by convolving the voxel with a filter that distributes the voxel's value to a neighborhood of pixels. Splatter algorithms may be described as forward projection since the voxels are projected directly into the image, in the same direction of the light rays.

Cell projection techniques are often used for volumes sampled on non-regular grids, and use polygon scan conversion to perform the projection. Multipass re-sampling algorithms operate by resampling the entire volume of the image coordinate system so that the re-sampled voxels line up behind each other on the viewing axis in image space. The voxels can then be composited together along the viewing axis as in a ray caster, except that in the re-sampled volume the viewing rays are always axis aligned. The viewing transformation is factored into a sequence of simple shears and scales, which are then applied to the volume in separate passes. Each shear or scale of the volume may be implemented with a scanline-order algorithm and a 1D-resampling filter. In this manner, for example, affine transformations may be implemented using three passes. The first pass samples the volume in the x direction of the volume. The new volume then becomes the input to the second pass, which re-samples the scanlines in the y direction. The result then feeds into the third pass, which re-samples scanlines in the z dimension.

The arbitrary nature of mapping from object space to image space complicates efficient, high-quality filtering and projection in object-order volume rendering algorithms, solved by transforming the volume to an intermediate coordinate system. Such a coordinate system is referred to in the art as sheared object space, where all viewing rays are parallel to a third coordinate axis. FIGS. 2A, 2B together show a perspective transformation. Horizontal lines 164 in the figures represent slices of the volume data viewed in cross section. Rays 166, in FIG. 2A, are shown emanating from source 162 through imaging plane 160 in volumetric object space (sampled data). After transformation, shown in FIG. 2B, the volume has been sheared parallel to the set of slices that is most perpendicular to the viewing direction and the viewing rays 166' are perpendicular to the slices, and scaled as well as translated. The reason for first computing a distorted intermediate image is that the properties of the factorization result in a very efficient implementation of the resampling and compositing loop. That is, scanlines of voxels in each voxel slice are parallel to scanlines of pixels in the intermediate range.

Conventional 3D scan conversion algorithms can use data structures similar to what are known as mixed-data-set rendering algorithms, wherein edge table and active edge tables keep track of which cropping planes intersect current voxel scan lines. The slopes of the cropping planes are used to calculate the intersection points incrementally as the algorithm iterates through voxel scanlines. The intersection points determine the bounds for the loop that iterates over voxels in a voxel scanline.

In volumetric analysis, the object under study is often a simple, more-or-less convex shape like a brain, heart, or engine block. A "Plane Crop" removes the entire portion of the volume that lies on a specified side of a plane in three-dimensional space. Cropping planes are commonly used in volume visualization applications to provide cutaway views of interior structures in a data set or to remove extraneous information while focusing on a particular part of a data set. Cropping planes with arbitrary orientations can be added to, for example, shear warp volume rendering algorithms by using 3D scan conversion algorithms to convert the cropping planes into bounds for rendering loops.

One known method for visualizing a volume using a cropping or slicing plane technique is shown in U.S. Pat. No. 5,454,371 ("the '371 patent"). The '371 patent provides an interactive user interface, which allows a user to manipulate a displayed image of a slice selected from a volume comprising a plurality of slices. Using the '371 patent technique, which is clearly distinguished from volume rendering, allows a user to rotate slices of a 3D image about an arbitrary axis. That is, a surface portion of an image for display may be translated to provide different cross-sectional views of the image and a selected surface of the displayed image may be rotated about an arbitrary axis, all using a graphical user interface.

The '371 patent performs a volume image reconstruction and stores the reconstructed volumetric image, that is, a volumetric image array, in an external file storage memory and/or display using Fenster's graphical user input device, i.e., a mouse. A routine implemented by the '371 patent assigns the volumetric image display a model in a form of a complex polyhedron having a plurality of planar faces defined in the same space as the 3D image to be displayed, typically a right parallelepiped, substantially enclosing all of the pixels in the volumetric image array. The model is then projected onto the screen of the monitor within a rectangular sub-region of the full screen display. Only visible faces of the model are displayed on the screen. Hidden-surface elimination is performed so the displayed model has an opaque appearance.

The display of each visible model face is accomplished in view of the fact that each screen pixel within the polygonal area of the displayed face has an associated 2D Cartesian coordinate pair, extendable to 3D. The 3D coordinates are then converted to voxel coordinates to select voxels in the volumetric image array. The extracted voxels are processed according to what is known in the art as texture mapping. The correspondence between display coordinates and volumetric image coordinates is determined by what Fenster defines as a viewing transformation. The Fenster patent further defines that the particulars of the viewing transformation are recomputed each time the user, using the graphical user interface, changes parameters such as angle of view, display scale, etc.

After the 3D image and model are displayed on the screen of the monitor, the initial view is saved in memory. While viewing, all user manipulation is accomplished using three actions defined as "point", "drag" and "click." The user may rotate the entire model and 3D image about an arbitrary axis, translate a selected plane of the model, and rotate a selected plane of the model about an arbitrary axis. The fixed point of rotation for the 3D image is constrained to be the geometrical center of the initial model.

The '371 patent describes the manipulations of the model with respect to the mathematical description of a convex polyhedron. A convex polyhedron is characterized by a set of half-spaces defined by at least four planes, referred to by the Fenster patent as bounding planes. It describes each face of the polyhedron as a convex polygon embedded in a corresponding bounding plane, where any change in the shape of the model polyhedron is implemented by changing the parameters of the bounding planes.

The '371 patent teaches two primary manipulations of the bounding plane coefficients. The user may change D, which is the perpendicular distance from the plane to the coordinate origin, and rotate. Rotation requires a change in the 3D coefficients, which collectively specify the orientation of the plane relative the coordinate axes. The '371 patent distinguishes between original bounding planes assigned to the model of the volumetric image array, and planes added in response to user input. Model faces corresponding to original bounding planes have their perimeter lines displayed as white lines, while faces corresponding to user added planes are indicated in another color. Only user added planes may be translated, rotated or deleted. As a user added plane is translated by a user via the graphical user interface, various cross sections of the image may be viewed as the translated plane slices through the volumetric image array.

While the '371 patent's graphical input device is moved to effect changes in the displayed view and the display is updated showing intermediate positions and orientations of the affected plane or planes, the patent's display module must re-sample the volumetric image display and complete the texture mapping process. The 3D rendering described in the '371 patent may be characterized as a crude simulation of volume rendering where exterior voxels are "painted" onto a rough polygonal approximation of the volume. The technique must be distinguished from conventional volume rendering, which shows the combined effect of all of the voxels in the volume from a particular point of view. In contrast with Fenster's '371 patent, the present invention includes a graphic plane, referred to interchangeably herein as a cropping plane, to crop out unwanted parts of a 3D image in real time, as well as an elegant user interface for controlling the cropping planes.

The present invention is directed to cropping a 3D physical volume, e.g., heart, kidney, etc., derived from acquired ultrasound data, and rendering the cropped volume for visualization in real time. Cropping is more powerful than slicing because cropping allows internal 3D structure to be viewed. The invention further provides for effective user control of the 3D volumetric cropping. To do so, the invention defines a cropping plane as a tangent to a sphere centered at the center of gravity of the object being imaged. That is, the center of gravity of the object to be imaged is assumed to be (0,0,0) in Cartesian coordinates. The boundaries of the object may be assumed to represent a rectangle where the sphere with a radius, R, circumscribes the rectangle (object). In such a representation, the diameter of the sphere is defined as the longest diagonal of the rectangle, passing through the origin (0,0,0). The radius of the sphere is one half the diagonal. It follows that the sphere fully encompasses the object's volume and is thus referred to herein as the "bounding sphere".

The cropping plane is defined in space with respect to a unit normal vector emanating from (0,0,0). The cropping plane is perpendicular to the unit normal vector. By default at initiation of the cropping features, the unit normal vector is equal to the radius as described such that the cropping plane is tangent to the sphere. As such, no cropping occurs without user input. By changing the dimension of the unit normal vector, or spherical radius, the orientation of the cropping plane is moved towards or away from the center of the object being imaged.

The present invention provides that the graphic plane or image appears different on each side of the cropping plane. For example, the colors green and purple may be used to distinguish voxels defining the graphic plane on each side of the cropping plane. Those skilled in the art should realize that other colors, patterns, intensities, etc., also may be used to distinguish between the front and back of the plane. In all of the inventive embodiments, the relationship of the plane to the image is locked and determines the portion of the image that is cropped. With respect to that portion of space where the unit normal vector is less than the radius of the bounded object, the voxels on the outside of the plane are zeroed out.

The user interface is such that the plane may be easily and readily manipulated with just the trackball providing that the user implemented view changes, image reconstructions and display of the changed image may be implemented and viewed in real time. Quite simply, the user merely changes the radius of the sphere, controlling/defining the depth at which the plane cuts into the image. Such an arrangement is quite convenient when viewing normally spherical shaped organs, such as the human heart.

An understanding of the present invention can be gained from the following detailed description of the invention, taken in conjunction with the accompanying drawings of which:

Figure 1:
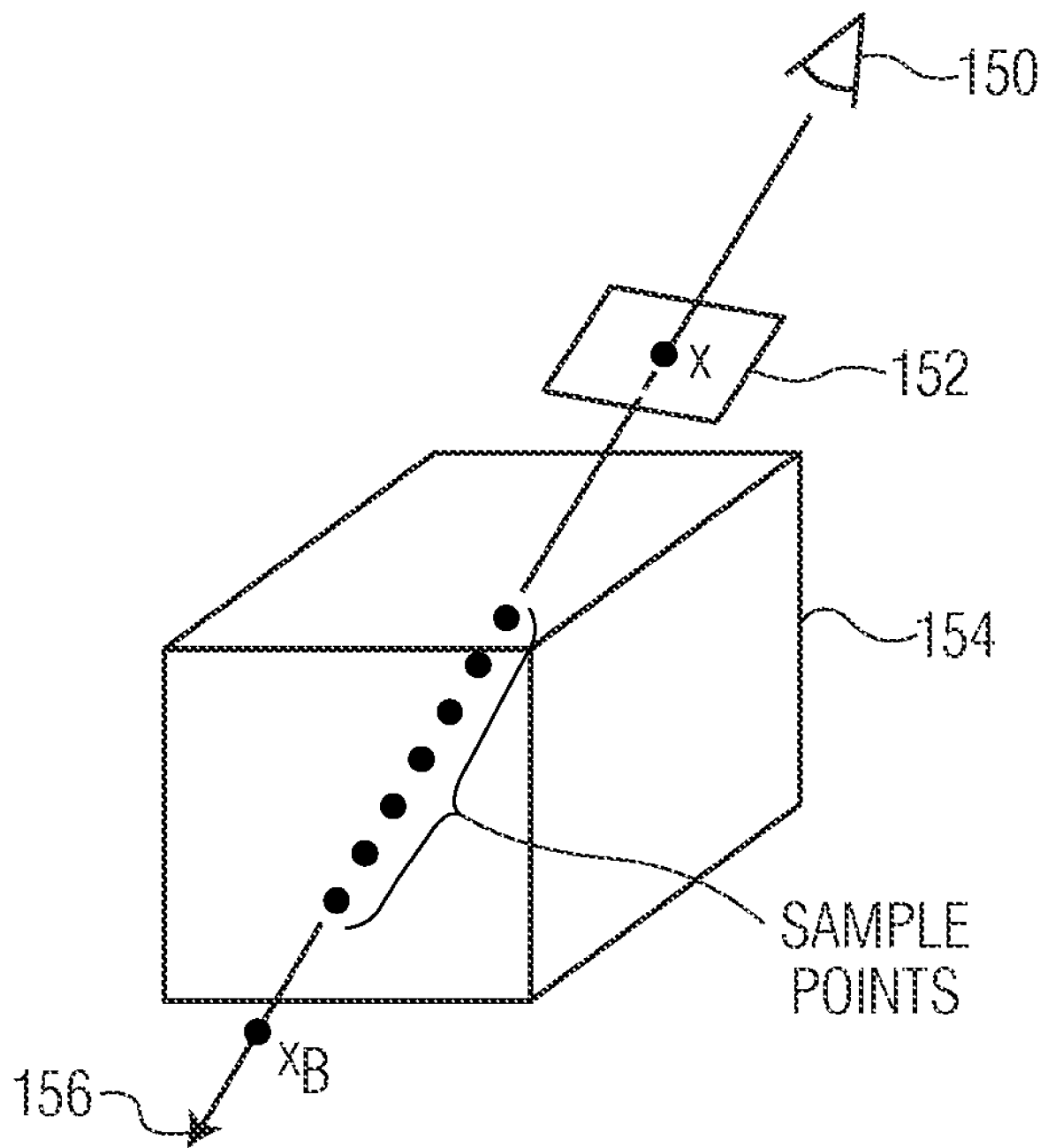
FIG. 1 is a prior art model for 3D volume rendering.
Figure 2:
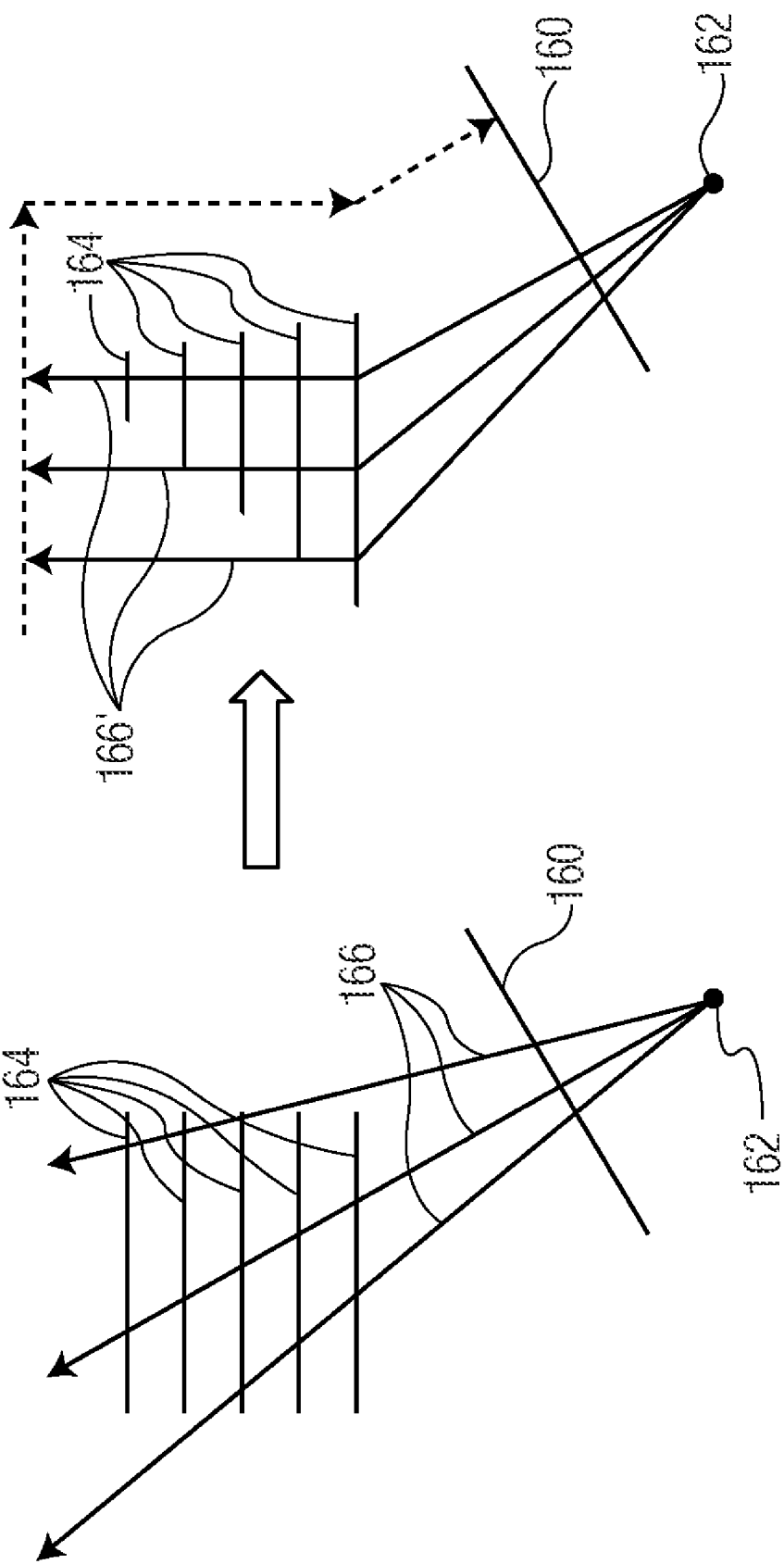
FIG. 2 is a prior art depiction of a transform of a volume into sheared object space to show a perspective projection.

The detailed description of preferred apparatus and methods that follow is presented in terms of routines and symbolic representations of operations of data bits within a memory, associated processors, and possibly networks, and network devices.

These descriptions and representations are the means used by those skilled in the art effectively convey the substance of their work to others skilled in the art. A routine is here, and generally, conceived to be a self-consistent sequence of steps or actions leading to a desired result. Thus, the term "routine" is generally used to refer to a series of operations performed by a processor, be it a central processing unit of an ultrasound system, or a secondary processing unit of such an ultrasound system, and as such, encompasses such terms of art as "program," "objects," "functions," "subroutines," and "procedures."

In general, the sequence of steps in the routines requires physical manipulation of physical quantities. Usually, though not necessarily, these quantities take the form of electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

In the present case, the routines and operations are machine operations to be performed in conjunction with human operators. Useful machines for performing the operations of the present invention include the SONOS line of ultrasound systems, commonly owned by the owner of this invention, and other similar devices. In general, the present invention relates to method steps, software, and associated hardware including computer readable medium, configured to store and/or process electrical or other physical signals using the routines described herein to generate other desired physical signals.

The apparatus set forth in the present application is preferably specifically constructed for the required purpose, i.e., ultrasound imaging, but the methods described herein may be embodied on a general purpose computer or other network device selectively activated or reconfigured by a routine stored in the computer and interface with the necessary ultrasound imaging equipment. The procedures presented herein are not inherently related to any particular Ultrasonic system, computer or other apparatus. In particular, various machines may be used with routines in accordance with the teachings herein, or it may prove more convenient to construct more specialized apparatus to perform the required method steps. In certain circumstances, when it is desirable that a piece of hardware possesses certain characteristics, these characteristics are described more fully in the following text. The required structures for a variety of these machines may appear in the description given below. Machines, which may perform the functions of the present invention, include those manufactured by such companies as PHILIPS MEDICAL SYSTEMS™ INTERNATIONAL, GE MEDICAL SYSTEMS™, and SIEMANS MEDICAL SYSTEMS™, as well as other manufacturers of ultrasound equipment.

With respect to the software described herein, those of ordinary skill in the art will recognize that there exist a variety of platforms and languages for creating software for performing the procedures outlined herein. Those of ordinary skill in the art also recognize that the choice of the exact platform and language is often dictated by the specifics of the actual system constructed, such that what may work for one type of system may not be efficient on another system.

Figure 3:
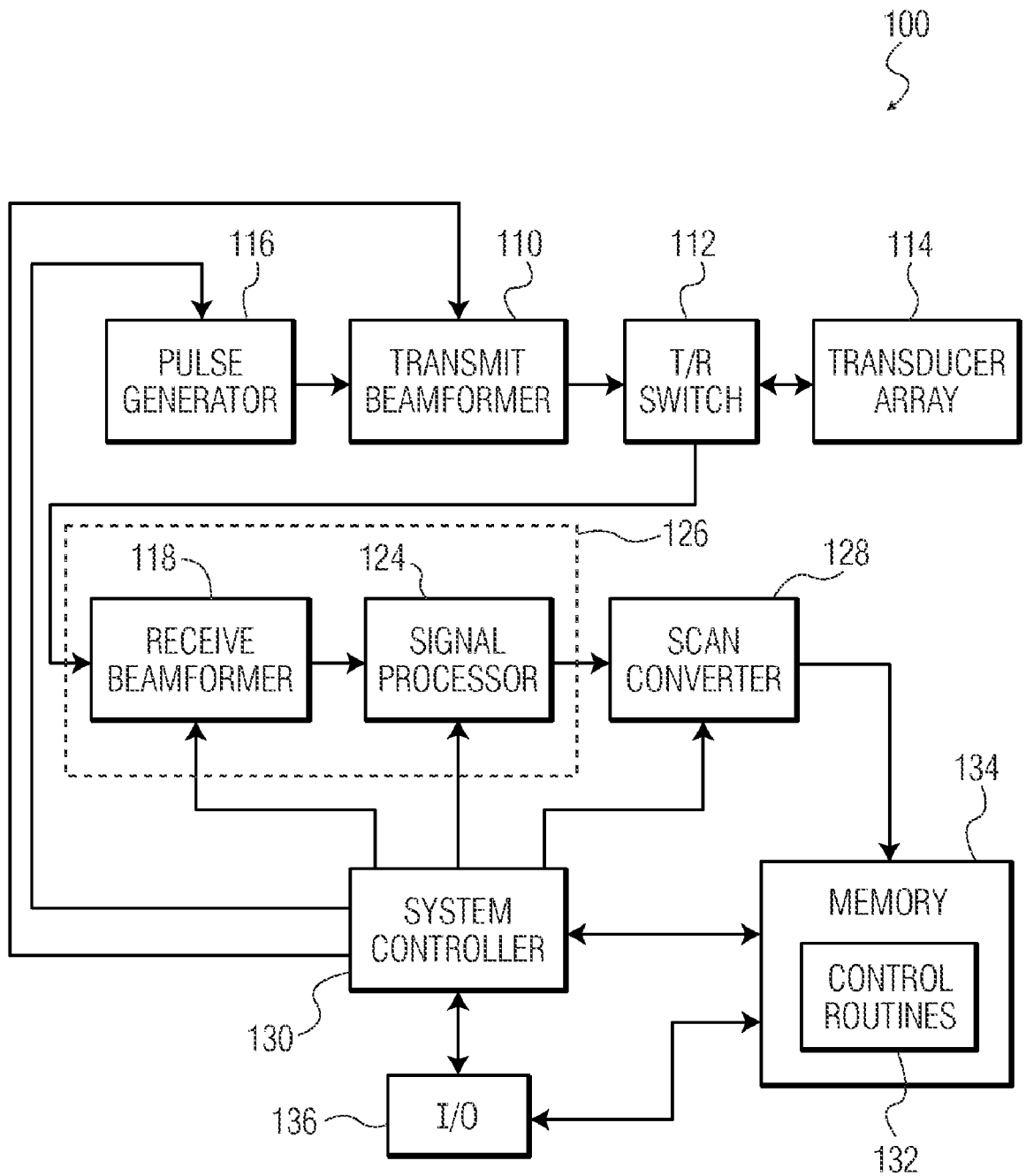
FIG. 3 is a simplified block diagram of an ultrasound system, which may be used to implement the present invention.

FIG. 3 is a simplified block diagram of an ultrasound imaging system 100 in accordance with a preferred embodiment of the present invention. It will be appreciated by those of ordinary skill in the relevant arts that the ultrasound imaging system 100, and the operation thereof as described hereinafter, is intended to be generally representative of medical imaging systems. Any particular system may differ significantly from that shown in FIG. 3, particularly in the details of construction and operation of such system. As such, the ultrasound imaging system 100 is to be regarded as illustrative and exemplary and not limiting as regards the invention described herein or the claims attached hereto.

The FIG. 3 ultrasound imaging system 100 shows a transmit beamformer 110 as coupled through a transmit/receive (T/R) switch 112 to a transducer array 114. Transducer array 114 includes an array of transducer elements, typically two-dimensional (2D) for use in 3D imaging. The T/R switch 112 normally includes one switch element for each transducer element. The transmit beamformer 110 receives pulse sequences from a pulse generator 116. The transducer array 114, energized by the transmit beamformer 110, transmits ultrasound energy into a region of interest (ROI) in a patient's body and receives reflected ultrasound energy, or echoes, from various structures and organs within the patient's body. As is known in the art, by appropriately delaying the waveforms applied to each transducer element by the transmit beamformer 110, a focused ultrasound beam is transmitted.

The transducer array 114 is also coupled, through the T/R switch 112, to a receive beamformer 118. Ultrasound energy from a given point within the patient's body is received by the transducer elements at different times. The transducer elements convert the received ultrasound energy to transducer signals which may be amplified, individually delayed and then summed by the receive beamformer 118. Such operation provides a beamformer signal that represents the received ultrasound level along a desired receive line. The receive beamformer 118 may be a digital beamformer including an analog-to-digital converter for converting the transducer signals to digital values. As known in the art, the delays applied to the transducer signals may be varied during reception of ultrasound energy to effect dynamic focusing. The process is repeated for multiple scan lines to provide signals for generating an image of the region of interest in the patient's body, and therefore, implement the 3D imaging.

The beamformer signals are applied to a signal processor 124, which processes the beamformer signals for improved image quality. The signal processor may include processes such as harmonic processing. The receive beamformer 118 and the signal processor 124 constitute an ultrasound receiver 126. The signal processor is where actual 3D reconstruction takes place within the system. The output of the signal processor 124 is supplied to a scan converter 128, which converts sector scan or other scan pattern signals to conventional raster scan display signals. The output of the scan converter 128 is buffered for eventual display.

A system controller 130 provides overall control of the system. The system controller 130 performs timing and control functions and typically includes a microprocessor operating under the control of control routines 132, stored in a memory 134. As will be discussed in detail below, the control routines 132, in addition to known control routines, include a variety of routines to create, store, index, and synchronize digitized information. The system controller 130 also utilizes the memory 134 to store intermediate values, including system variables describing the operation of the ultrasound imaging system 100, and to buffer various outputs, including the output of the scan converter 128.

An Input/Output unit 136 (hereinafter referred to as "user interface") controls a variety of input and output operations, for example, a conventional trackball or mouse (not shown in the figure). The user interface of this invention provides several interactive controls, preferably implemented by a trackball.

After a loop is acquired, there are no crops applied to the volume. The user indicates the desire to manipulate cropping by turning the crop mode selector to ON. At this point the cropping plane appears at its default location, typically rotated to the side to prevent obscuring the volume. The default location is always defined by a radius, R, a fixed distance from the center of the volume at (0,0,0) which defines a sphere completely encompassing the entire volume. The default plane is tangential to the sphere defined by the radius, and crops out nothing.

Figure 4:
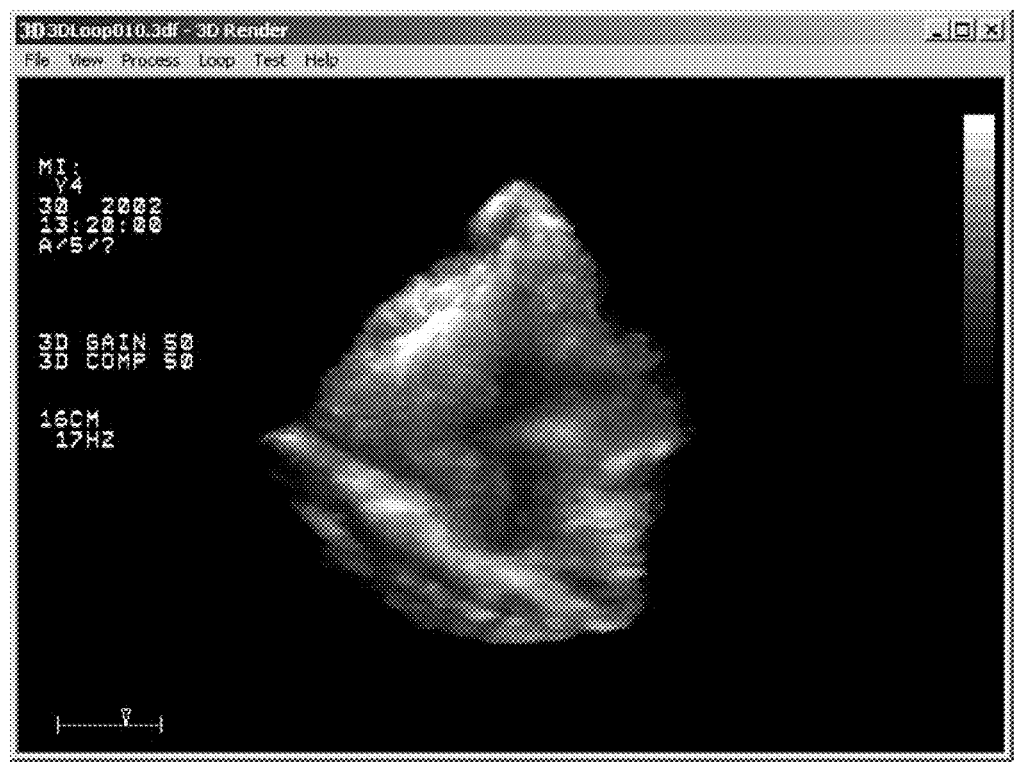
FIG. 4 is screen shot of a 3D image of an object.
Figure 5:
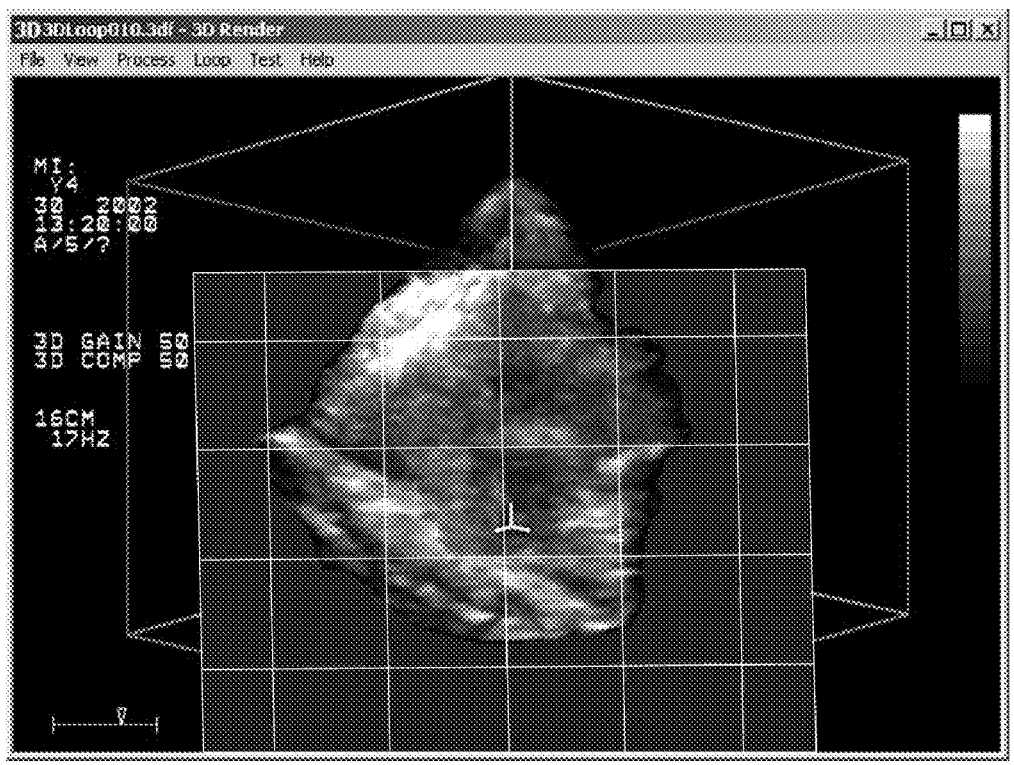
FIG. 5 is a screen shot of the 3D image of the object shown in FIG. 4, where the crop mode feature of the present invention has been initiated by a user, and the cropping plane may be seen in the foreground of the 3D image space.

FIG. 4 shows the 3D volume of an object being imaged, where FIG. 5 shows the same object imaged in FIG. 4 with the cropping mode enabled. In the embodiment shown in FIG. 5, the plane appears in purple and in parallel to the plane of the screen. A "crop mode" selector provided by the inventive user interface turns control of the cropping plane on and off. Once the user initiates the crop mode, the trackball is used to control the orientation of the volume/plane. No cropping has yet been implemented because the radius of the sphere, and therefore the position of the plane with respect to the center (0,0,0), still merely bound rather than crop the object.

The user can move the crop cursor around the volume by moving the trackball, which will move the plane around on the surface of the bounding sphere. The crop adjust knob will move the plane toward or away from the center of the volume, decreasing or increasing R. As the plane moves, the volume will be cropped interactively. As assistance to visualization, the portion of the volume where the cropping plane intersects the volume will be shown as grayscale while the remainder of the volume (which is behind the plane) will be tinted the same color as the plane.

Figure 6:
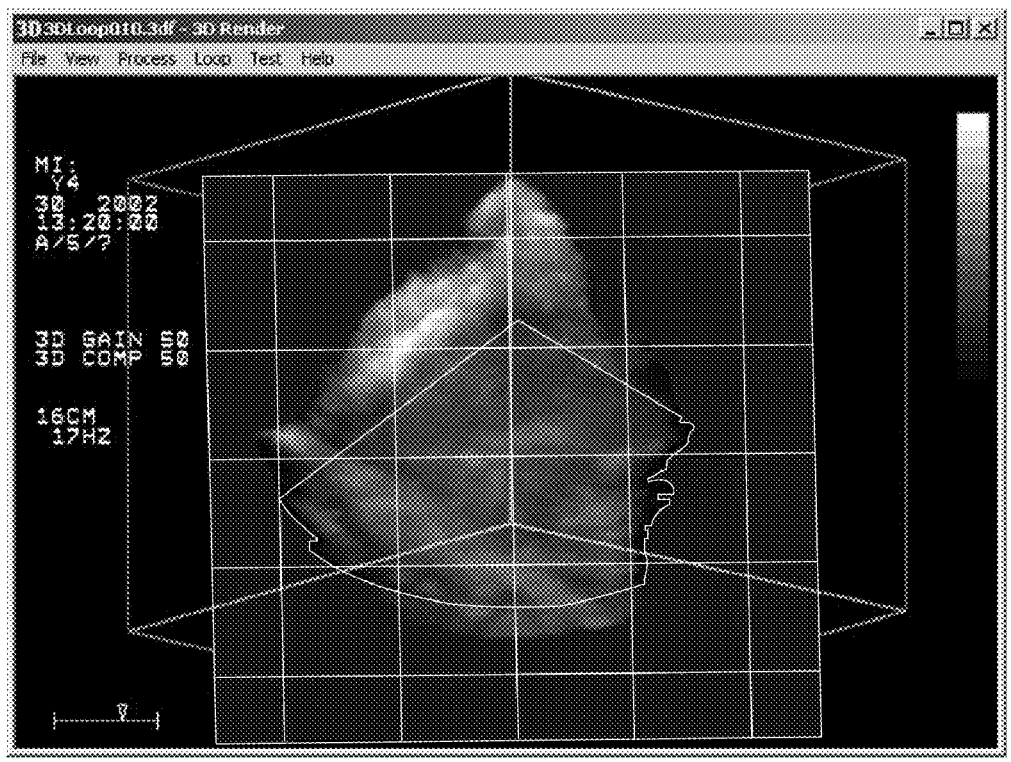
FIG. 6 is a screen shot of the 3D image where the cropping plane has been adjusted by the user to crop out 40% of the 3D image of the object.
Figure 7:
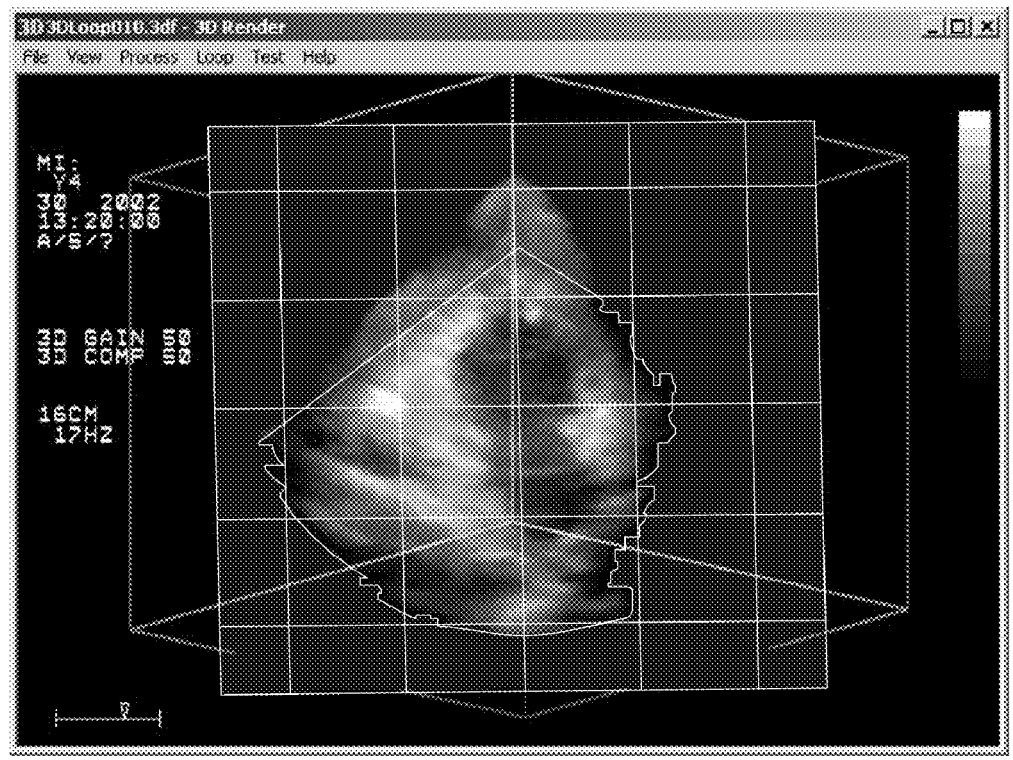
FIG. 7 is a screen shot of the 3D image where the cropping plane has been adjusted by the user to crop out 60% of the 3D image of the object.

By rotating the crop adjustment knob of the user interface, the percentage of the cropping is adjusted. Rotating counterclockwise moves the cropping plane towards the origin (0,0,0), decreasing R. Rotating counterclockwise moves the cropping plane away from the origin (0,0,0). FIG. 6 shows the 3D volume with approximately 40% of the image on the user side of the cropping plane cropped away. FIG. 7 shows the image where the cropping is further adjusted to 60%. A desired feature is then seen as the darkened area in the upper portion of the object volume.

Figure 8:
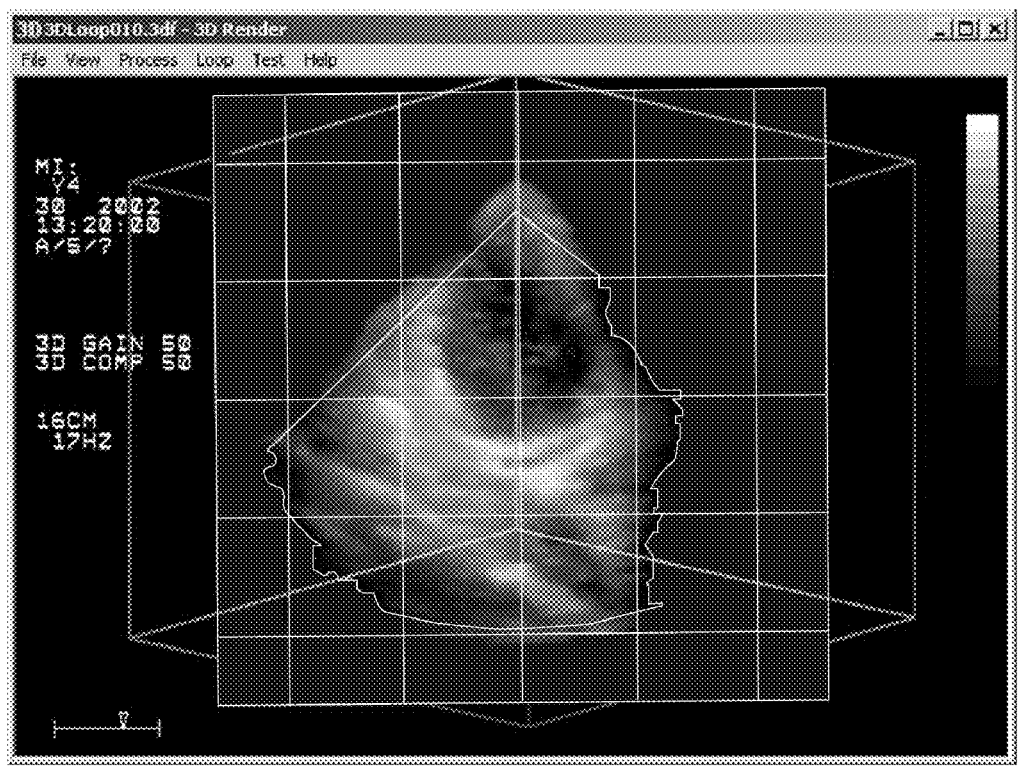
FIG. 8 is a screen shot of the 3D image where the cropping plane has been rotated upward to change an orientation of the image.

Another feature of the user interface of this invention includes the ability to rotate the cropping plane to change the orientation of the view of the feature. FIG. 8 shows the image of the object where cropping has been rotated by moving the track ball upward.

Figure 9:
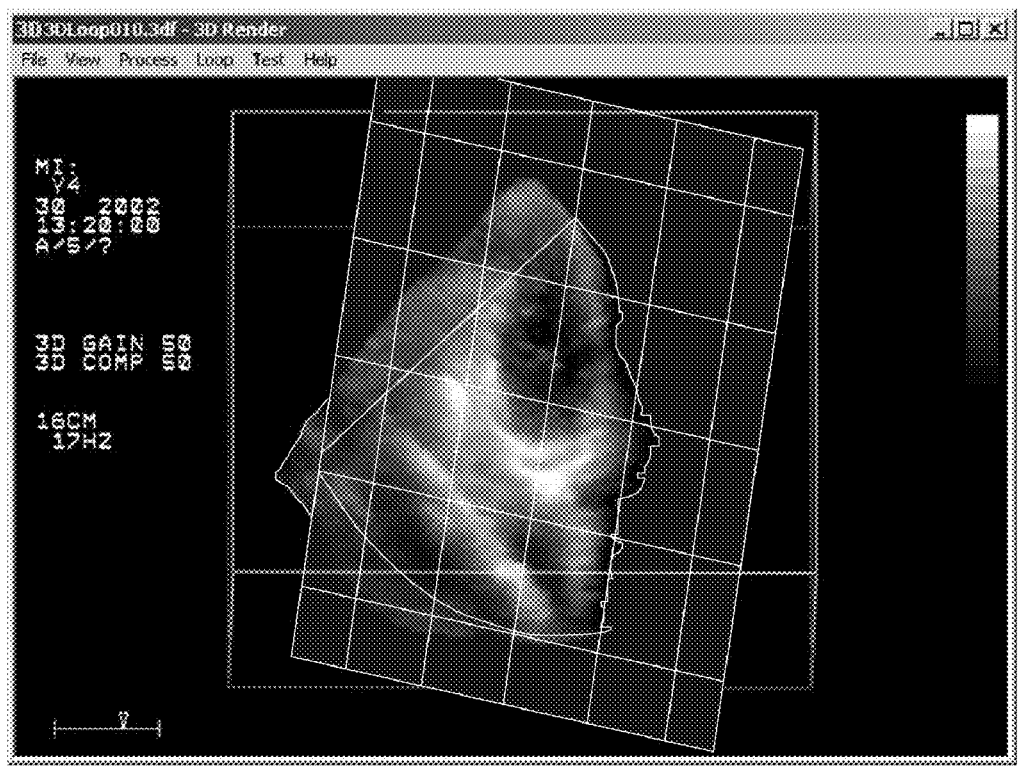
FIG. 9 is a screen shot of the 3D image with a plane lock button pressed, the trackball rotated to the right with no crop change.

A "Lock Plane to Volume" toggle which controls whether the cropping plane rotates independently of or in conjunction with the volume. Such operation is highlighted with the screen shot shown in FIG. 9. When the "Lock Plane To Volume" button is ON (plane lock button), the crop cursor is locked to the volume and will therefore rotate as the volume is rotated in order to maintain a fixed relationship to the volume. If the "cursor locked" button is OFF, then the cursor will remain fixed in place and the volume will rotate thus changing the position of the crop with respect to the volume. The crop will be undone at the current location and redone at the new location.

The user is then free to change the cropping amount and location as desired until they are satisfied with the current state of the crop, at which point they can hit the "store" button. This will add the current crop to the crop list associated with the volume and then begin a new crop. The current crop can be abandoned by dialing the crop position back to 0 (OFF).

Figure 10:
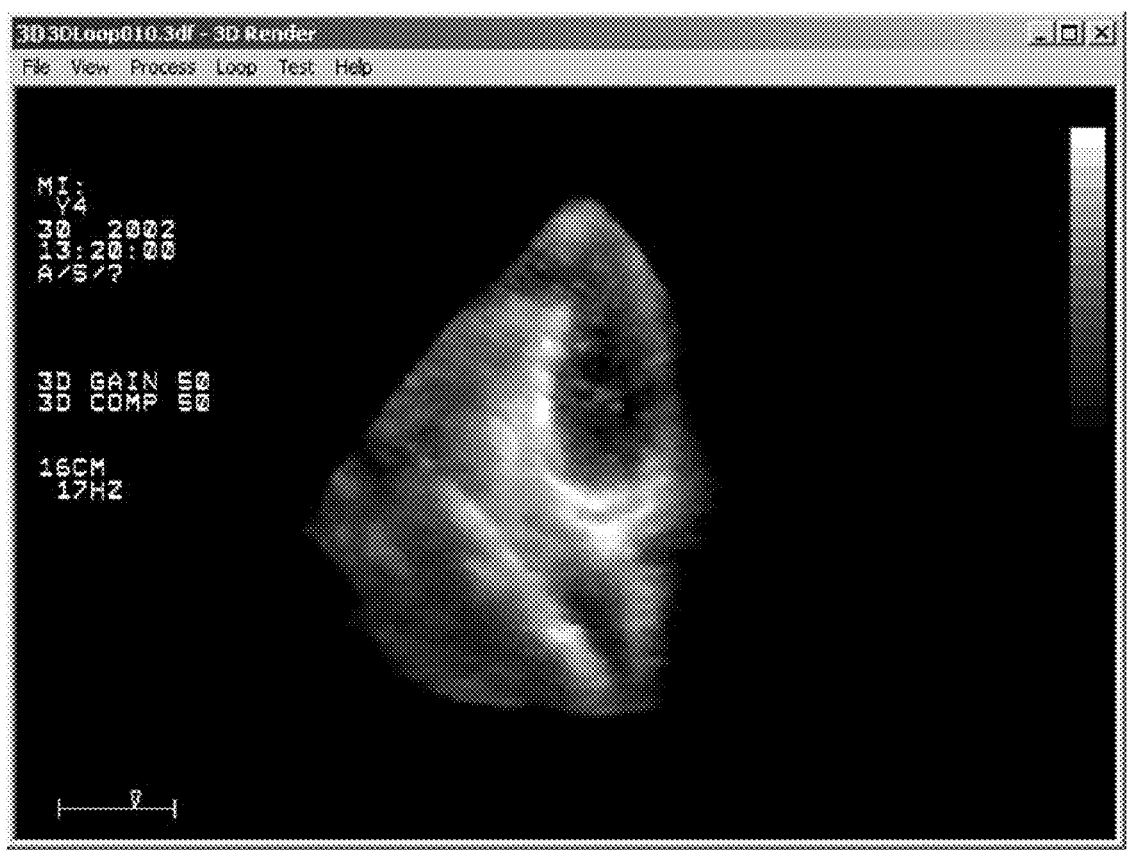
FIG. 10 is a screen shot of the 3D image with the save crop button pressed, where the volume is shown with the crop applied.

And another feature of the user interface of the present invention is the "save crop" feature. The save crop feature allows the user to bind the current crop setting to the volume. FIG. 10 is a screen shot which highlights the feature of the invention which allows the user to save a particular crop. The volume shown in the figure is with the crop applied.

Although a few examples of the present invention have been shown and described, it would be appreciated by those skilled in the art that changes might be made in these embodiments without departing from the principles and spirit of the invention, the scope of which is defined in the claims and their equivalents.

The invention claimed is:

1. A method for interactive adjustment of a 3D ultrasound image of an object, the method comprising the acts of:
   acquiring a loop of 3D image data of the object, and providing a 3D image of the object on a display for user viewing; and
   activating a crop mode via a user interface in response to a user input, wherein a cropping plane is generated and oriented in relation to the orientation of the image of the object in image space, and the cropping plane is displayed along with the 3D image, and wherein the user may manipulate the user interface to control the orientation of the cropping plane in the image space with respect to the orientation of the image, wherein the cropping plane includes a tangent to a sphere centered at a center of the object being imaged, and wherein the image has a first color on a first side of the cropping plane and has a second color on a second side of the cropping plane, the first color being a color of the cropping plane.

2. The method set forth in claim 1, wherein the act of activating includes using a trackball.

3. The method set forth in claim 1, wherein the act of activating includes implementation of a save crop setting, wherein a current crop, defined by a current user defined cropping plane orientation, is bound to the object volume.

4. The method set forth in claim 1, wherein the act of activating includes implementation of a feature, which determines whether the cropping plane is locked to the volume of the object being imaged, where instead of rotating independently, rotation of the cropping plane rotates the 3D image.

5. The method set forth in claim 1, wherein the act of activating includes turning the crop mode on and off.

6. The method of claim 1, wherein the sphere circumscribes the object.

7. The method of claim 6, wherein the cropping plane is moved towards or away from the center of the object being imaged by changing a radius of the sphere.

8. The method of claim 1, wherein the sphere circumscribes a rectangle representing boundaries of the object.

9. The method of claim 8, wherein a diameter of the sphere is a longest diagonal of the rectangle, passing through the center.

10. The method of claim 1 wherein, for a default cropping plane initially displayed, a radius of the sphere is equal to a unit normal vector such that no cropping occurs without user input.

11. The method of claim 10, wherein the default cropping plane is moved towards or away from the center of the object being imaged by changing at least one of a radius of the sphere and a dimension of the unit normal vector.

12. The method of claim 1, wherein the first color is purple and the first side of the image is behind the cropping plane, and the second color is green and the second side of the image is in front of the cropping plane.

13. The method of claim 1, wherein a portion of the image where the cropping plane intersects the image is shown as grayscale.

14. The method of claim 1, wherein the cropping plane is configured to crop out unwanted parts of the image to display a changed image in real time.

15. The method of claim 1, wherein the cropping plane is initially displayed at a default location on the sphere that completely surrounds the image, the default location being rotated to a side to prevent obscuring the image.

16. A computer readable memory containing a set of computer instructions when executed by a processor are configured for interactive adjustment of a 3D ultrasound image of an object obtained by a device by performing the acts of:
   acquiring a loop of 3D image data of the object, and providing a 3D image of the object on a display for user viewing; and
   activating a crop mode via a user interface in response to a user input, wherein a cropping plane is generated and oriented in relation to the orientation of the image of the object in image space, and the cropping plane is displayed along with the 3D image, and wherein the user may manipulate the user interface to control the orientation of the cropping plane in the image space with respect to the orientation of the image, wherein the cropping plane includes a tangent to a sphere centered at a center of the object being imaged, and wherein the image has a first color on a first side of the cropping plane and has a second color on a second side of the cropping plane, the first color being a color of the cropping plane.

17. The computer readable memory of claim 16, wherein the sphere circumscribes the object.

18. The computer readable memory of claim 17, wherein the cropping plane is moved towards or away from the center of the object being imaged by changing a radius of the sphere.

19. The computer readable memory of claim 16, wherein the sphere circumscribes a rectangle representing boundaries of the object.

20. The computer readable memory of claim 19, wherein a diameter of the sphere is a longest diagonal of the rectangle, passing through the center.

21. The computer readable memory of claim 16 wherein, for a default cropping plane initially displayed, a radius of the sphere is equal to a unit normal vector such that no cropping occurs without user input.

22. The computer readable memory of claim 21, wherein the default cropping plane is moved towards or away from the center of the object being imaged by changing at least one of a radius of the sphere and a dimension of the unit normal vector.

23. The computer readable memory of claim 16, wherein the first color is purple and the second color is green.

24. The computer readable memory of claim 16, wherein the cropping plane is configured to crop out unwanted parts of the image to display a changed image in real time.

25. The computer readable memory of claim 16, wherein the cropping plane is initially displayed at a default location on the sphere that completely surrounds the image, the default location being rotated to a side to prevent obscuring the image.

26. A device for interactive adjustment of a 3D ultrasound image of an object comprising a processor configured to:
   acquire a loop of 3D image data of the object, and provide a 3D image of the object on a display for user viewing; and
   activate a crop mode in response to a user input, wherein a cropping plane is generated and oriented in relation to the orientation of the image of the object in image space, and the cropping plane is displayed along with the 3D image, and wherein the user may manipulate the user interface to control the orientation of the cropping plane in the image space with respect to the orientation of the image, wherein the cropping plane includes a tangent to a sphere centered at a center of the object being imaged, and wherein the image has a first color on a first side of the cropping plane and has a second color on a second side of the cropping plane, the first color being a color of the cropping plane.

27. The device of claim 26, wherein the processor is further configured to move the cropping plane towards or away from the center of the object being imaged by changing a radius of a sphere that circumscribes the object.

28. The device of claim 26, wherein the first color is purple and the second color is green.

29. The device of claim 26, wherein the cropping plane is configured to crop out unwanted parts of the image to display a changed image in real time.

30. The device of claim 26, wherein the cropping plane is initially displayed at a default location on the sphere that completely surrounds the image, the default location being rotated to a side to prevent obscuring the image.

* * * * *